US012798317B2

(12) United States Patent
Mazyek et al.

(10) Patent No.: US 12,798,317 B2
(45) Date of Patent: Nov. 17, 2026

(54) LANE GUIDANCE SYSTEM

(71) Applicant: Trailer Dynamics GmbH, Eschweiler (DE)

(72) Inventors: Raid Mazyek, Aachen (DE); Helko Mues, Aachen (DE); Abdullah Jaber, Aachen (DE)

(73) Assignee: Trailer Dynamics GmbH, Eschweiler (DE)

( * ) Notice: Subject to any disclaimer, the term of this patent is extended or adjusted under 35 U.S.C. 154(b) by 0 days.

(21) Appl. No.: 19/103,965

(22) PCT Filed: Aug. 8, 2023

(86) PCT No.: PCT/EP2023/071919
§ 371 (c)(1),
(2) Date: Feb. 14, 2025

(87) PCT Pub. No.: WO2024/037934
PCT Pub. Date: Feb. 22, 2024

(65) Prior Publication Data

US 2026/0048632 A1 Feb. 19, 2026

(30) Foreign Application Priority Data

Aug. 17, 2022 (DE) ..................... 10 2022 120 763.3

(51) Int. Cl.
*B60G 9/02* (2006.01)
*B62D 59/00* (2006.01)

(52) U.S. Cl.
CPC ............. *B60G 9/025* (2013.01); *B62D 59/00* (2013.01); *B60G 2200/342* (2013.01); *B60G 2200/422* (2013.01); *B60G 2300/042* (2013.01)

(58) Field of Classification Search
CPC .............. B60G 9/025; B60G 2200/342; B60G 2200/422; B60G 2300/042; B62D 59/00
See application file for complete search history.

(56) References Cited

U.S. PATENT DOCUMENTS 5,054,575 A * 10/1991 Collins .................. B60G 9/027 280/124.112
5,458,359 A * 10/1995 Brandt ..................... B60G 9/00 180/378

(Continued)

FOREIGN PATENT DOCUMENTS

CA 3023291 A1 6/2019
CN 111114233 A * 5/2020 ........... B60G 21/051

(Continued)

OTHER PUBLICATIONS

CN-111114233-A Machine English Translation (Year: 2020).*

(Continued)

*Primary Examiner* — Jason D Shanske
*Assistant Examiner* — Matthew James O'Neill
(74) *Attorney, Agent, or Firm* — Millen, White, Zelano & Branigan, P.C.; Christopher W. Brody

(57) ABSTRACT

The invention relates to a lane guidance system (10) for guiding and stabilising a vehicle axle along a lane, comprising a Watt linkage arrangement for connecting, in relatively movable manner, the vehicle axle to an underside (x) of a chassis, wherein the Watt linkage arrangement has at least two Watt linkages (20) which correspond in their guide direction (F) and are arranged in the transverse direction (Q), wherein the Watt linkage arrangement has a guide element (30) for guiding the vehicle axle along a straight line in the guide direction (F). According to the invention, the Watt linkages (20) are fastened, by means of their longitudinal ends (22, 24), to the guide element (30) and to the chassis, wherein the guided vehicle axle is a trailer axle (A) of a semitrailer.

18 Claims, 4 Drawing Sheets

(56) References Cited

U.S. PATENT DOCUMENTS

| | | | | |
|---|---|---|---|---|
| 5,649,719 | A | 7/1997 | Wallace et al. | |
| 6,808,035 | B1 | 10/2004 | Keeler | |
| 2006/0237938 | A1* | 10/2006 | Imre | B60G 9/00<br>280/124.156 |
| 2011/0094807 | A1* | 4/2011 | Pruitt | B60L 50/40<br>180/65.6 |
| 2019/0168559 | A1* | 6/2019 | Brown | B60G 9/00 |

FOREIGN PATENT DOCUMENTS

| | | | |
|---|---|---|---|
| DE | 4015974 | A1 | 12/1990 |
| DE | 102021106267 | A1 | 9/2022 |
| EP | 0880440 | A1 | 12/1998 |
| EP | 1648722 | A1 | 4/2006 |
| EP | 4059755 | A1 | 9/2022 |
| FR | 411183 | A | 6/1910 |
| JP | 2005053321 | A | 3/2005 |
| WO | 9730860 | A1 | 8/1997 |

OTHER PUBLICATIONS

International Search Report dated Oct. 27, 2023, issued in corresponding application No. PCT/EP2023/071919 (pp. 1-23).
Office Action for related German application 10 2022 120 763.3, dated May 24, 2023.

* cited by examiner

LANE GUIDANCE SYSTEM

FIELD OF THE INVENTION

The invention relates to a track guidance system for guiding and stabilizing a vehicle axle along a track, and to a vehicle axle of a semitrailer having a track guidance system of this kind.

BACKGROUND ART

Track guidance devices for guiding a vehicle axle along a track and relative to a chassis are a matter of common knowledge both in the case of passenger cars and in the case of trucks. They are used primarily to absorb and transmit forces associated with driving dynamics, and they stabilize the tracking of a wheel and axle suspension during a trip.

Guiding and stabilizing vehicle axles by means of a Watt mechanism, named after the inventor James Watt, is a known practice in the passenger car sector. In this context, the Watt mechanism forms a coupling mechanism for converting types of movement and is made up of at least two Watt rods and a guide element (also: Watt parallelogram, Watt's link or Watt cross). The guide element is arranged rotatably on the guided vehicle axle. The Watt rods are arranged in a transverse direction parallel to the guided vehicle axle. In this case, the Watt rods are connected via their longitudinal ends to the vehicle body, on the one hand, and to the guide element, on the other hand. Via the guide element, they convert a rotary pivoting movement in the plane into an approximately straight-line movement. As a result, straight-line guidance of the vehicle axle can always take place in the guidance direction of the Watt rods, despite loads associated with driving dynamics. The Watt mechanism is used variously on passenger cars with a rigid axle or with a twist-beam axle for wheel and track guidance in order to prevent a longitudinal or sideways movement of the vehicle axle and to improve driving dynamics.

In the truck and commercial vehicle sector, rigid axles are used on almost all vehicle types. Fundamentally, the rigid axle suspension is a mechanism with two degrees of freedom, wherein the wheels on one axle are connected to one another via a rigid axle body. In this case, the axle body is guided by leaf springs, links and joints relative to the chassis and the body. The track guidance of the vehicle axles is generally performed by means of a "Panhard rod". The Panhard rod provides for the transverse guidance of the axle. Because of this function, the Panhard rod is often also referred to as a "transverse link". Tractor-trailers (semitrailer trucks) are a rig consisting of a semitrailer tractor and a semitrailer (referred to below as a trailer) coupled thereto. The semitrailer tractor is a vehicle derived from a truck which has a fifth wheel coupling for the trailer instead of a loading surface. The axles of the semitrailer tractor are generally guided by means of a Panhard rod, whereas the trailer, which is typically of three-axle design, does not normally have any track guidance since these axles are merely taken along passively and are not used for purposes of driving.

It is disadvantageous here that the omission of a track guidance device on trailer axles is associated with unwanted oscillations of the trailer axle and leads to increased tire wear and damage to the bearing units of the links and joints. In addition, it has a negative effect on the durability of the functional links and of the entire axle suspension. This is especially the case if one of the trailer axles is driven and, for example, is fitted with an electric auxiliary drive. In unfavorable weather conditions and in the case of irregularities or gradients of the roadway, this may even lead to dynamic destabilization of the driven trailer axle. The analogous use of a Panhard rod for the track guidance Of trailer axles is not helpful. The disadvantage here is that track guidance by means of a Panhard rod can only be implemented in a very narrow ride height range, but, depending on the situation, the trailer must assume different ride heights. Moreover, the vertical movement of the vehicle axle in the case of guidance by means of a Panhard rod does not take place vertically and in a straight line. However, almost vertical and straight-line guidance is necessary on a driven trailer axle.

SUMMARY OF THE INVENTION

It is therefore the object of the invention to overcome these and other disadvantages of the prior art and to provide an improved track guidance system which is constructed in a low-cost and compact way using simple means and allows substantially vertical and straight-line vertical or height-related movement in the guidance of a vehicle axle. The device should consist of the smallest possible number of individual components which can be arranged on an underside of a chassis without taking up a large amount of space. The system should furthermore be able to reproduce the different ride heights required in the trailer sector.

In a track guidance system for guiding and stabilizing a vehicle axle along a track, comprising a Watt linkage arrangement for the relatively movable connection of the vehicle axle to an underside of a chassis, wherein the Watt linkage arrangement has at least two Watt rods, which correspond in their guidance direction and are arranged in the transverse direction, wherein the Watt linkage arrangement has a guide element for guiding the vehicle axle along a straight line in the guidance direction, it is envisaged according to the invention that the Watt rods are secured, by means of their longitudinal ends, on the guide element and on the chassis, wherein the guided vehicle axle is a trailer axle of a semitrailer.

By virtue of the structural design of the Watt linkage arrangement and the mechanical connection of the trailer axle, the guide element, the Watt rods and the chassis, the trailer axle can be guided almost vertically and in a straight line along the guidance direction. By virtue of the principle involved, it is in any case possible to implement larger differences in height when guiding an axle by means of a Watt mechanism than with a Panhard rod. The ride height variance of the track guidance system is furthermore assisted by additional technical features of the individual components. These are elucidated in detail below.

The invention is based on the realization that driven vehicle axles of a semitrailer, that is to say trailer axles, must be guided. In addition to lateral guidance forces and relatively low braking torques, the trailer axle must namely be able to absorb additional drive torques and forces owing to the driving function. Moreover, the mass of the axle is increased significantly by the drive unit, and therefore, without a track guidance system, a driven trailer axle cannot be dragged along like a conventional trailer axle without a drive unit.

Accordingly, one embodiment of the invention envisages that the trailer axle is a driven axle. The guided trailer axle preferably comprises a motor-transmission unit, wherein the motor-transmission unit of the trailer axle is dimensioned in such a way that it forms a smaller auxiliary drive for a larger main drive of a semitrailer tractor.

Here, the track guidance system is preferably arranged parallel to the driven trailer axle, wherein the track guidance system is matched to the geometry of a three-axle trailer. Precise force transmission, particularly in the transverse direction of the vehicle axle, is thereby assisted, and a mechanical equilibrium is established. Overall, secondary loads in relation to the vehicle axle are thereby suppressed.

The proposed system does not have to be adapted to a trailer axle. In principle, the system can be employed on unilaterally supported running gear assemblies comprising functional links. In this case, many different fastening and arrangement variants of the system can be implemented. In one specific embodiment of the invention, the guided vehicle axle can be a drawbar trailer axle, for example. In another embodiment, the guided vehicle axle can be a dolly axle. This can be a matter of main drive axles and/or driven trailing axles and/or driven steering axles.

According to one preferred variant embodiment, the at least two Watt rods are arranged spaced apart from one another along their common guidance direction, wherein the Watt rods are arranged laterally offset in relation to their common guidance direction. The provision of at least two spaced Watt rods has the advantage, in particular that, in addition to straight-line guidance of the trailer axle in the guidance direction—which can already be implemented with a single Watt linkage—it is also possible to suppress what are known as rolling or, where applicable, pitching movements. This is associated with the fact that the spaced Watt rods between the underside of the chassis and the trailer axle can transmit not only transverse forces (like a single Watt linkage) but also, by virtue of the spacing between the two Watt rods, which acts as a lever arm, torques, e.g. roll torques. That is to say that, on the basis of this variant embodiment, the track guidance system can also transmit torques in addition to guiding the trailer axle in a straight line. It is thus possible to effectively suppress unwanted rotational movements of the trailer axle about at least one of its main axes. The lateral offset in relation to their common direction of straight-line guidance additionally allows a particularly compact and space-saving arrangement of the Watt linkage arrangement and, at the same time, increases the freedom of design in respect of the shaping and spatial arrangement of the Watt rods.

According to another preferred embodiment, the Watt rods are of adjustable-length design in the transverse direction, wherein the Watt rods have an adjusting element for adjusting their length. Depending on the trailer or semitrailer tractor to which the trailer is coupled, there may namely be different requirements in respect of the effectiveness and width or track width of the arrangement. The adjusting element opens up the possibility of simple and rapid adaptation or adjustment of the track width and effectiveness of the Watt linkage arrangement without having to first disassemble it. Moreover, this opens up the possibility during assembly of aligning the track guidance system centrally on the trailer axle and guiding it into the correct position. At the same time, the adjustability of the Watt rods compensates for production tolerances, and this in turn has a positive effect on manufacturing costs and manufacturing effort.

It is preferred in this context that the adjusting element is designed as a rotary nut and is arranged centrally on the Watt rods, wherein those portions of the Watt rods which are adjacent to the rotary nut are provided with opposing threads. The combination of the opposing thread of the Watt rods and of the rotary nut represents a very simple and low-cost variant of an adjustment function. By virtue of the central arrangement, equal distances are obtained on the right and left of the rotary nut, thereby enabling the Watt rods to be adjusted uniformly. As an alternative, milled engagement surfaces may also be provided, for example, and these act as adjusting elements.

The guide element is preferably secured substantially centrally on the vehicle axle. As a result, a mechanical equilibrium is established and secondary loads due to offsets and lever arm effects are very largely suppressed. In order to ensure the initially mentioned ride height variance and to enable every possible vertical position of a trailer axle to be guided, the guide element is preferably of elliptical design, wherein the guide element has a central opening. The central opening is suitable for purposes of supporting the guide element on corresponding mounting elements and is preferably arranged in alignment with the axis of the guidance direction. The central opening of the guide element is guided in a straight line in the guidance direction. In this case, the central opening of the guide element preferably has a groove for lubrication of the rotatable support of the guide element.

In this case, the elliptical guide element is preferably widest at the level of the central opening, wherein the elliptical guide element has narrow ends, which extend in the vertical direction and the guidance direction. By virtue of the wider design of the center of the guide element, the torque transmission and calibration of the Watt rods along their direction of straight-line guidance are improved. By means of this embodiment, the precise alignment and geometrical adaptation of the guide element are furthermore predetermined. By virtue of the fact that the narrow ends of the guide element are aligned in the vertical direction or in the guidance direction of the Watt rods, all the ride height variance of a trailer can be covered by the track guidance system. In general, depending on the adjustment of the chassis, there is a maximum height difference of 300 mm in relation to a standard height of the trailer in an initial position, and this has to be reproduced by the track guidance system. The elliptical shape and the design of the narrow ends in the vertical direction ensure that the track guidance system can be used in the case of height changes of up to 300 mm. This embodiment ensures stable guidance of the trailer axle at all times, even in an “emergency running mode” of the trailer or of the semitrailer truck and during the coupling process and when negotiating very steep ramps or the like.

According to another preferred embodiment, the invention envisages that the inner longitudinal ends of the Watt rods are secured rotatably and pivotably on the narrow ends of the guide element via spherical plain bearings, wherein the outer longitudinal ends of the Watt rods are secured rotatably and pivotably on the underside of the chassis via spherical plain bearings. By virtue of this support, the Watt rods can rotate about their own axis and, at the same time, provide the required pivoting movement in the guidance direction. Overall, this supports the implementation of the Watt mechanism, thus enabling the trailer axle to be guided in a straight line along the guidance direction in a restricted and relatively movable manner with respect to the underside of the chassis. Furthermore, this embodiment is particularly advantageous in respect of a circular movement of the trailer axle which takes place during the setting of different ride heights. By virtue of the degrees of freedom provided, the Watt rods can compensate for the loads which act on the trailer axle on account of the circular movement.

According to an alternative variant embodiment, the spherical plain bearings of the Watt rods lie substantially in a common movement plane. That is to say that the spherical plain bearings of the Watt rods are positioned in such a way that the positions of all the joints define said movement plane, or all the joints of the at least two Watt rods lie substantially in one and the same plane. This variant embodiment is advantageous inasmuch as mechanical stresses are thereby avoided, or inasmuch as in this way the generation of secondary torques and forces that could occur in the event of any distance between movement planes of different Watt linkages is prevented.

According to one preferred embodiment, two holding brackets are provided in the region of the outer longitudinal ends of the Watt rods, wherein the holding brackets are arranged perpendicularly to the underside of the chassis. In this case, it is preferred that the holding brackets have recesses, wherein the recesses of the holding brackets are matched in shape to corresponding chassis portions on the underside of the chassis. The holding brackets arranged perpendicularly to the underside of the chassis connect the Watt rods to the chassis and, at the same time, act as a reinforcing intermediate element. By virtue of the fact that the holding brackets are arranged perpendicularly, the Watt rods can be fixed by means of a simple bolt support arrangement, for example, without negatively affecting the desired movement of the Watt mechanism. By virtue of the shape matching of the recesses, the holding brackets can be mounted practically with a form fit on appropriately corresponding chassis portions. By virtue of the form fit after the mounting of the holding brackets, there is the advantageous option of securing the holding brackets by material bonding (e.g. welding) on the chassis and on a corresponding axle bracket of a third axle of the trailer. Overall, the holding brackets according to this embodiment can be integrated without problems into the underside of the chassis.

The outer longitudinal ends of the Watt rods are preferably mounted rotatably and pivotably in the holding brackets via spherical plain bearings, wherein the holding brackets have reinforcing struts which extend diagonally over the full height of the holding brackets. This increases, in particular, the mechanical strength and stiffness of the holding brackets, thus allowing precise introduction of force in the direction of the Watt linkage arrangement. It is furthermore preferred here that the holding brackets are of identical design. This opens up a number of possibilities for the alignment of the track guidance system. In this case, the holding brackets preferably have U profiles. The U profiles assist the mounting and materially bonded connection of the holding brackets to the chassis. At the same time, the U profile offers sufficient space to implement the articulated mounting of the Watt rods.

According to one preferred embodiment, the holding brackets comprise a material with a high tensile strength, in particular structural steel S500. In particular, the holding brackets are under extremely high mechanical stresses during the operation of the track guidance system. By virtue of the high tensile strength, the holding brackets can also withstand high transverse and lateral guidance forces. This reduces the risk of fracture and counteracts bending.

According to one preferred variant embodiment, an axle bridge for the mechanical support of the trailer axle and for receiving the guide element is provided, wherein the axle bridge has vertical raised portions in the vertical direction on its longitudinal sides. Here, the axle bridge serves primarily as a reinforcing element for the trailer axle and increases the stiffness and strength of the trailer axle. In this case, the axle bridge is preferably arranged parallel to the trailer axle, wherein the vertical raised portions have a substantially triangular shape. The vertical raised portions additionally reinforce the bridge and, at the same time, advantageously offer mounting material for other elements, e.g. the guide element.

In one preferred embodiment, the invention envisages that the axle bridge is designed as a rectangular tube profile, wherein the rectangular tube profile comprises an internal framework to reinforce the axle bridge. The tube profile of the axle bridge and the inner framework increase the stiffness and mechanical strength of the axle bridge. At the same time, the overall weight of the track guidance system is reduced. Other tube profile shapes that have an internal framework are also conceivable. In this context, the decisive factors for selection of the profile are primarily the manufacturing effort and the production costs. In this case, the internal framework of the axle bridge can preferably have transverse and/or longitudinal and/or diagonal struts. The struts reinforce the axle bridge and, above all, increase mechanical bending strength and torsional rigidity.

According to one preferred embodiment, the guide element is secured on the axle bridge, wherein the guide element is arranged substantially centrally on the axle bridge. It is thereby possible to combine the advantageous mechanical effects of the axle bridge with precise straight-line guidance of the trailer axle along the guidance direction. The guide element is preferably mounted rotatably on the axle bridge. This enables the guide element to absorb torques associated with the driving dynamics in addition to the forces associated with the driving dynamics. These may act on the guide element and the trailer axle in the form of rolling movements of the trailer, for example. The rotatable mounting of the guide element thus relieves the load on the trailer axle since it absorbs the forces and torques that occur in association with the driving dynamics and thereby prevents load transfer to the trailer axle. The above-described central opening in the guide element is advantageously available to receive a suitable bearing element.

In this context, another preferred variant embodiment of the invention envisages that the axle bridge has a bearing journal, arranged substantially perpendicularly to the trailer axle, for the rotatable support of the guide element, wherein the bearing journal is arranged in alignment with a vehicle central longitudinal axis. It is particularly preferred here that the bearing journal is passed in the longitudinal direction through the vertical raised portions of the axle bridge and through the guide element secured on the axle bridge. In this case, the bearing journal is preferably passed through the central opening in the guide element. This represents a particularly compact and strong structure for a Watt linkage arrangement and assists with uniform torque absorption at the guide element. The bearing journal is preferably of cylindrical design. This enables the bearing journal to be supported in openings of the vertical raised portions and to be passed through the central opening in the guide element.

As a preferred option, two lateral functional links are fixed in the longitudinal direction on the underside of the chassis, wherein the axle bridge is arranged in the transverse direction between the lateral functional links. In this case, the axle bridge is preferably secured on spring supports of the functional links. The spring supports serve primarily as a supporting surface for the spring-damper unit of a trailer. Typically, pneumatic bellows springs are used on trailers to cushion the chassis and the mass of the body. As a preferred option, the elements to be secured and the ends of the axle bridge are superimposed at the level of the spring supports and fixed, wherein the axle bridge connects the two functional links in the transverse direction. This represents a particularly strong, secure and compact connection of the axle elements from a mechanical point of view.

In order to provide additional support for the trailer axle in the longitudinal and transverse directions and to support the Watt mechanism during the straight-line guidance of the axle, the axle bridge is preferably provided with a basic body facing the trailer axle, wherein at least two supporting links, in particular four supporting links, are provided, which connect the basic body to the underside of the chassis. The supporting links serve primarily to deal with camber and to stabilize the trailer axle. In this case, the supporting links are preferably fixed rotatably and pivotably on the basic body and on the functional links via spherical plain bearings. In this case, the supporting links extend in the longitudinal, transverse and vertical directions. By virtue of the articulated mounting of the supporting links, a movement of the bearing journal along a circular path or a three-dimensional trajectory during the guidance of the trailer axle is supported. The rotatable and pivotable jointed mounting simultaneously ensures simple and reliable fixing of the supporting links on the basic body and on the functional links. The spherical plain bearings on the basic body can preferably be rubber-metal joints which comprise an elastomer. This reduces the torsional rigidity of the trailer axle, thereby establishing better contact with the roadway. Overall, it is preferred that the axle bridge is arranged in the longitudinal direction between the basic body and the Watt linkage arrangement, wherein the basic body is arranged on the longitudinal side of the axle bridge which faces the trailer axle to be guided.

According to an alternative embodiment, the track guidance system is of inverse design, wherein the bearing journal is secured directly between two chassis rails, and wherein the guide element is secured rotatably on the bearing journal. In this case, a crossmember is provided which, on the one hand, receives the bearing journal for the rotatable support of the guide element and, on the other hand, is connected to the underside of the chassis. The crossmember preferably has a U profile in the region of support for the bearing journal to simplify the mounting of the bearing journal. The crossmember is preferably of trapezoidal design and has a trapezoidal recess. In this embodiment, the above-described system components are of substantially identical construction, whereas the Watt rods in the inverse embodiment are not fixed via holding brackets on the underside of the chassis. Instead, two mounting points for the outer longitudinal ends of the Watt rods are provided to the side of the trailer axle. The inner longitudinal ends of the Watt rods are connected to the guide element. In this case, the mounting points at the outer longitudinal ends of the Watt rods can preferably be formed on the functional links and at the level of the Watt rods. One significant advantage of this embodiment consists in that the installation space in the region of the trailer axle and of the track guidance system is significantly increased, thus enabling the corresponding components to be installed more easily. In this case, the motor-transmission unit and the axle configuration can be externally sourced as ready-made series components and adapted by means of the track guidance system and the trailer axle. One of the two mounting points preferably extends in the vertical direction in order to set the difference in height between the two Watt rods. In this embodiment too, all the longitudinal ends of the Watt rods are secured rotatably and pivotably by means of spherical plain bearings. All the other above-defined embodiment details can be transferred to the inverse variant, provided that the different attachment of the outer longitudinal ends of the Watt rods and the implementation of a Watt mechanism are preserved.

Further features, details and advantages of the invention will become apparent from the wording of the claims and from the following description of exemplary embodiments with reference to the drawings.

DETAILED DESCRIPTION OF THE DRAWINGS

Figure 1:
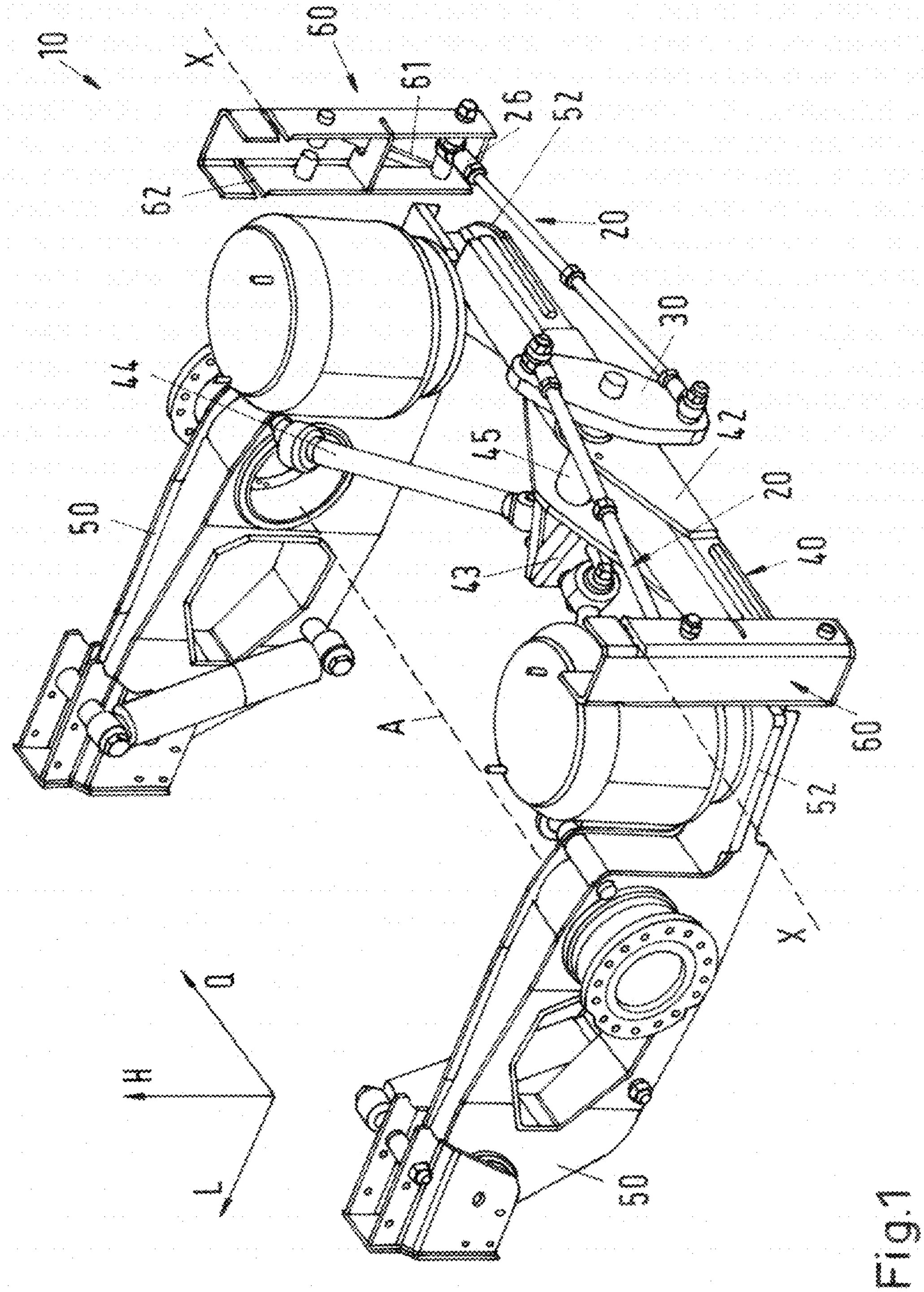
FIG. 1 shows a schematic oblique view of a track guidance system according to the invention for a trailer axle in the assembled position.

The track guidance system, denoted in general by 10 in FIG. 1, for guiding and stabilizing a trailer axle A (not illustrated in detail) along a track comprises a Watt linkage arrangement, aligned in the transverse direction Q, for the relatively movable connection of the trailer axle A to an underside X of a chassis (not illustrated). This is a driven trailer axle A of a semitrailer truck. The track guidance system 10 is arranged parallel to the driven trailer axle A, wherein the track guidance system is matched to the geometry of a three-axle trailer. The trailer axle A comprises a motor-transmission unit (not shown), wherein the motor-transmission unit of the driven trailer axle A is dimensioned in such a way that it forms a smaller auxiliary drive for a larger main drive of a semitrailer tractor.

The Watt linkage arrangement has two Watt rods 20, which correspond in their guidance direction and are arranged in the transverse direction Q, and a guide element 30 for guiding the trailer axle A in a straight line along the guidance direction of the Watt rods 20. In this case, the Watt rods 20 are secured by means of their longitudinal ends on the guide element 30 and on the chassis of the trailer. As can be seen, two vertically arranged holding brackets 60 with recesses 62 are provided on the underside X of the chassis, via which recesses the holding brackets 60 are simply mounted in a form-fitting manner and welded onto corresponding chassis portions. The recesses 62 are therefore matched in shape to the corresponding portions of the underside x of the chassis. For mechanical reinforcement, the holding brackets are furthermore provided with a diagonally arranged reinforcing strut 61 and are designed as U profiles.

As can furthermore be seen, an axle bridge 40 is provided for mechanical support of the trailer axle A and for receiving the guide element 30, wherein the axle bridge 40 has on its longitudinal sides vertical raised portions 42 in the vertical direction H. In this case, the axle bridge is arranged parallel to the trailer axle A, wherein the vertical raised portions 42 have a substantially triangular shape. The guide element 30 is secured substantially centrally on the axle bridge 40 and on the trailer axle A.

To receive and rotatably support the guide element 30, the axle bridge 40 has a bearing journal 45, which is arranged substantially perpendicularly to the trailer axle A and is of cylindrical design, wherein the bearing journal 45 is arranged in alignment with a vehicle central longitudinal axis. In this case, the bearing journal 45 is passed in the longitudinal direction L through the vertical raised portions 42 of the axle bridge 40 and through the guide element 30 secured on the axle bridge 40.

TWO lateral functional links 50 are fixed in the longitudinal direction L on the underside x of the chassis, wherein the axle bridge 40 is arranged in the transverse direction Q between the lateral functional links 50. In this case, the axle bridge 40 is secured on spring supports 52 of the functional links 50.

For additional longitudinal and transverse support of the trailer axle A, the axle bridge 40 is provided with a basic body 43, wherein at least two supporting links 44 are provided, which connect the basic body 43 to the underside x of the chassis. In this case, the supporting links 44 extend in the longitudinal, transverse and vertical directions L, Q, H. In relation to the longitudinal direction L, the axle bridge 40 is arranged between the basic body 43 and the Watt linkage arrangement, wherein the basic body 43 is arranged on the longitudinal side of the axle bridge 40 which faces the guided trailer axle A.

Figure 2:
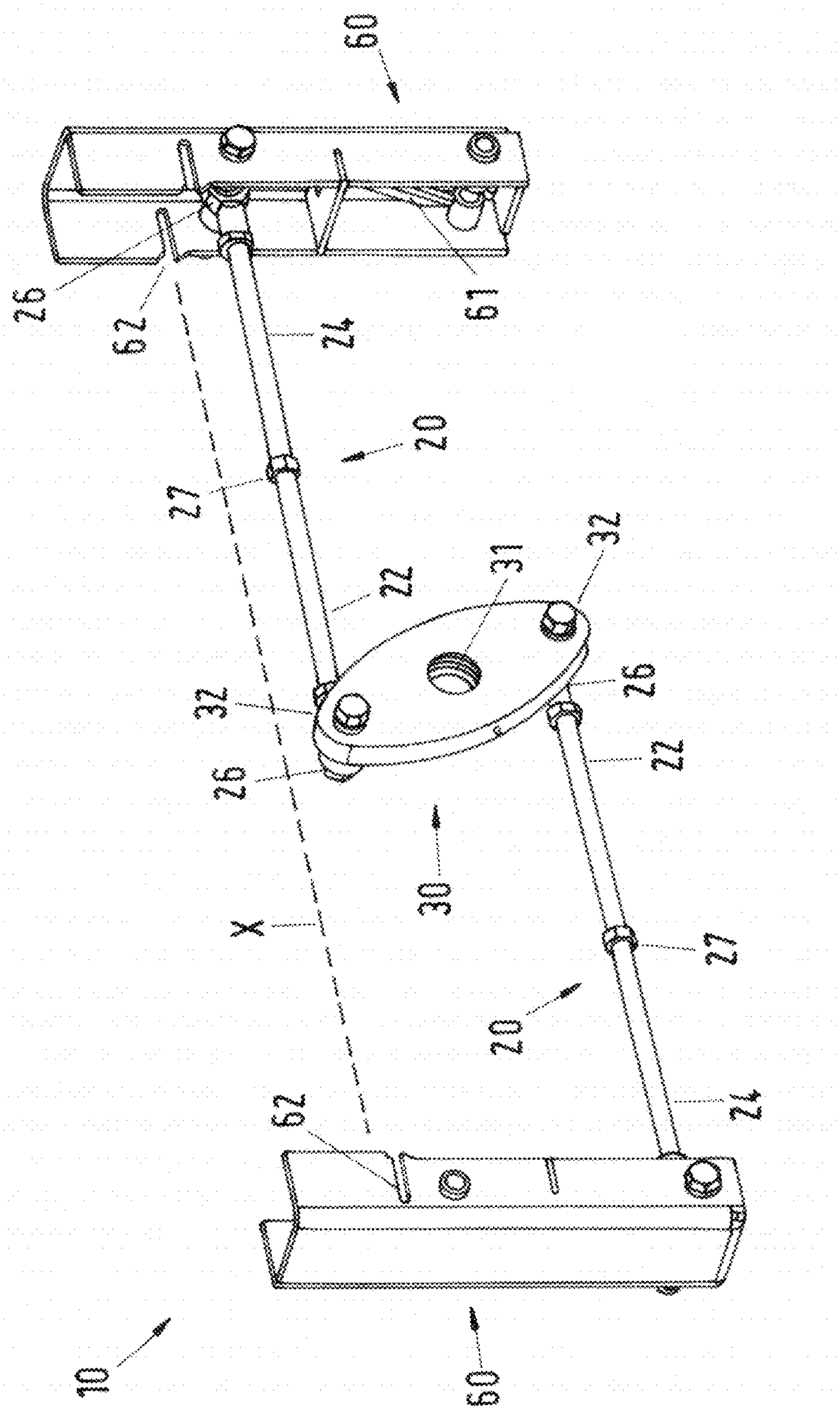
FIG. 2 shows a schematic isolated illustration of a track guidance system according to the invention for a trailer axle in the disassembled position.

Referring additionally to FIG. 2 makes it clear that the bearing journal 45 is passed through the guide element 30 via a central opening 31 of the guide element 30 and rotatably supports the guide element 30.

The guide element 30 is of elliptical design and has narrow ends 32, which extend in the vertical and guidance directions H, F. The Watt rods 20 have inner and outer longitudinal ends 22, 24. In this case, the inner longitudinal ends 22 of the Watt rods 20 are fixed rotatably and pivotably on the narrow ends 32 of the elliptical guide element 30 by means of spherical plain bearings 26. The outer longitudinal ends 24 of the Watt rods 20 are likewise fixed rotatably and pivotably on the holding brackets 60 and thus on the underside x of the chassis by means of spherical plain bearings 26. The supporting links 44 illustrated in FIG. 1 are also secured rotatably and pivotably on the basic body 43 and on the underside x of the chassis by means of similar spherical plain bearings. The spherical plain bearings 26 of the Watt rods 20 lie substantially in a common movement plane.

As is furthermore illustrated in greater detail in FIG. 2, the Watt rods 20 are of adjustable-length design in the transverse direction Q, wherein the Watt rods 20 have an adjusting element 27 for adjusting their length. The adjusting elements 27 are designed as rotary nuts and are arranged centrally on the Watt rods 20, wherein those portions of the Watt rods 20 which are adjacent to the rotary nut are provided with opposing threads (not illustrated).

Figure 3A:
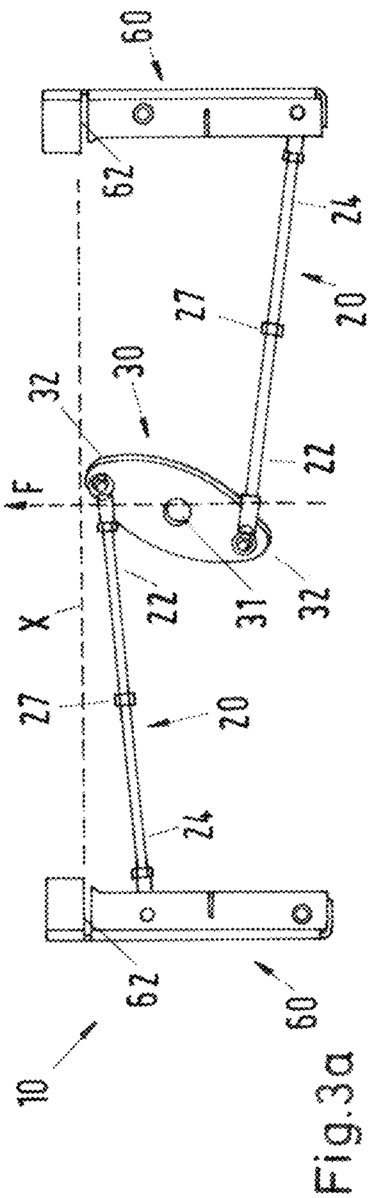
FIG. 3*a* shows a schematic front view of a track guidance system according to the invention for a trailer axle in a standard ride height position.
Figure 3B:
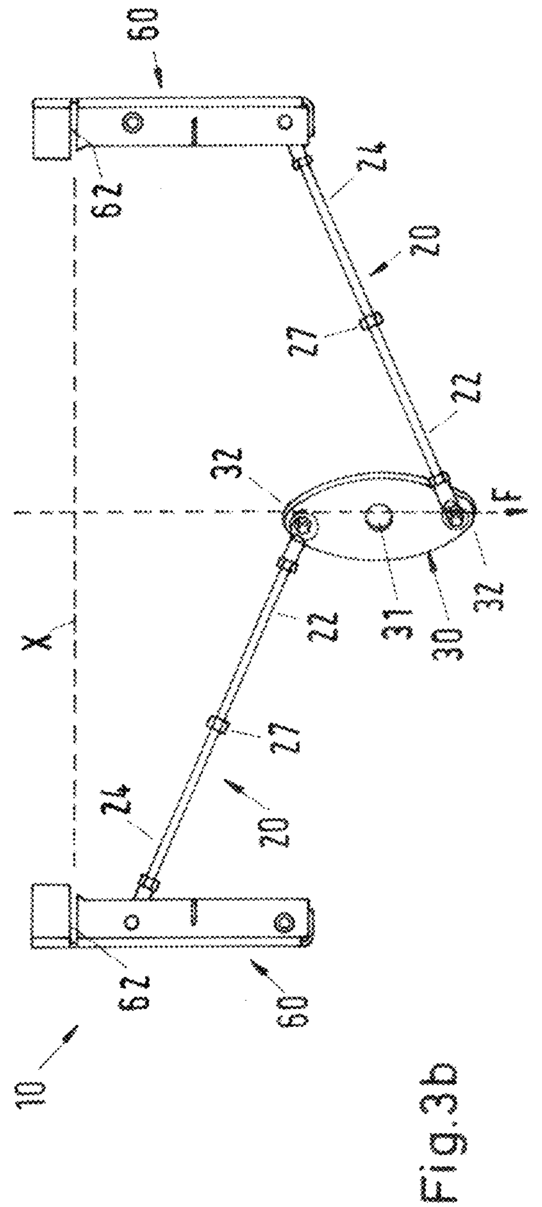
FIG. 3*b* shows a schematic front view of a track guidance system according to the invention for a trailer axle in a ride height position raised to the maximum extent.

FIGS. 3*a* and 3*b* are intended primarily to illustrate the ride height variance of the track guidance system 10. The at least two Watt rods 20 are arranged spaced apart from one another along their common guidance direction F, wherein the Watt rods 20 are arranged laterally offset in relation to their common guidance direction F.

Here, FIG. 3*a* schematically shows the position of the track guidance system 10 at a standard ride height of the trailer. In FIG. 3*b*, a maximum ride height difference of 300 mm in relation to the standard ride height has been set, that is to say the chassis of the trailer has been raised by 300 mm in relation to the standard ride height. As can be seen, the central opening 31 of the guide element 30 and thus also the bearing journal 45 is guided continuously in a straight line on the guide axis or along the guidance direction F and perpendicularly to the underside x of the chassis.

Figure 4:
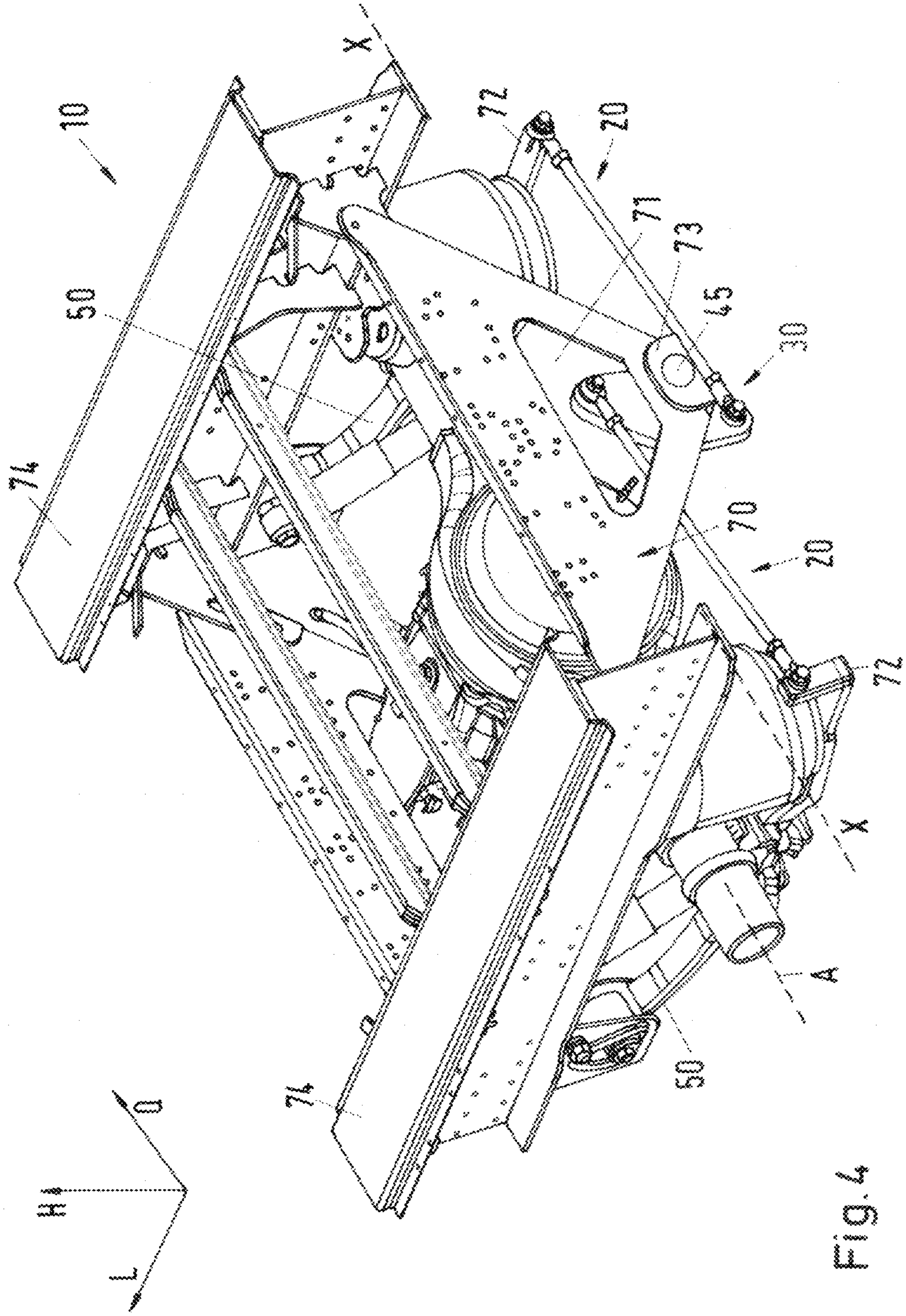
FIG. 4 shows a schematic oblique view of an alternative (inverse) embodiment of a track guidance system for a trailer axle in the assembled position.

FIG. 4 illustrates an alternative, inverse variant embodiment of the track guidance system. This differs in some technical partial aspects from the adverse basic embodiment of the invention. As can be seen, the bearing journal 45 is secured directly between two chassis rails 74. According to this variant embodiment, there is no need for an axle bridge configuration. Instead of the axle bridge 40 and the holding brackets 60, a crossmember 70 is provided, which provides the support and attachment of the track guidance system 10 or the guide element 30 and Watt rods 20.

The guide element 30 is secured rotatably on the bearing journal 45. Here, on the one hand, the crossmember 70 receives the bearing journal 45 for the rotatable support of the guide element 30 and, on the other hand, the crossmember 70 is connected via the chassis rails 74 to the underside x of the chassis.

The crossmember 70 furthermore has a U profile 73 in the region of the support of the bearing journal 45 in order to simplify the mounting of the bearing journal 45. The crossmember 70 is of trapezoidal design and has a trapezoidal recess 71. In this case, the trapezoidal crossmember 70 and the trapezoidal recess 71 are each aligned with their shorter sides in the direction of the roadway.

To support and accommodate the Watt rods 20, two mounting points 72 are provided for the outer longitudinal ends 24 of the Watt rods 20. As in the adverse embodiment, the inner longitudinal ends 22 of the Watt rods 20 are connected to the guide element 30. In this case, the mounting points 72 at the outer longitudinal ends 24 of the Watt rods 20 are formed on the functional links 50 and at the level of the Watt rods 20. As can be seen, the left-hand mounting point 72 extends in the vertical direction H in order to set the height difference between the two Watt rods 20.

In the inverse embodiment shown in FIG. 4, the other, above-described, system components are of substantially identical construction. According to the alternative variant embodiment shown in FIG. 4, all the longitudinal ends 22, 24 of the Watt rods 20 are likewise secured rotatably and pivotably by means of spherical plain bearings 26. All the other above-defined configuration details can be transferred to the inverse variant as long as the described attachment via the crossmember 70 and the implementation of a Watt mechanism is preserved.

The invention is not restricted to one of the above-described embodiments but can be modified in many different ways. Thus, for example, a plurality of Watt rods and/or guide elements in various variant embodiments can be provided. As an alternative, the support for the bearing journal can be provided directly via the chassis, without an axle bridge.

In general, the track guidance system according to the invention can be used to guide a vehicle axle along a track and relative to an underbody. The system is fundamentally suitable for guiding and stabilizing unilaterally supported running gear assemblies comprising functional links for semitrailers, drawbar trailers, dollies or commercial vehicles. In this case, the system can guide main drive axles, driven trailing axles and driven steering axles inter alia. In particular, the track guidance system according to the invention is provided for guiding and stabilizing driven trailer axles.

All the features and advantages which emerge from the claims, the description and the drawing, including design details, spatial arrangements and method steps, may be essential to the invention in themselves or in many different combinations.

LIST OF REFERENCE SIGNS

X underside of chassis
A trailer axle
longitudinal direction
H vertical direction
Q transverse direction
F (straight-line) guidance direction
10 track guidance system
20 Watt rods
22 inner longitudinal ends
24 outer longitudinal ends
26 spherical plain bearings (3D)
27 adjusting element
30 guide element
31 central opening
32 narrow ends
40 axle bridge
42 vertical raised portions
43 basic body
44 supporting links
45 bearing journal
50 functional links
52 spring supports
60 holding brackets
61 reinforcing strut
62 recesses
70 crossmember
71 recess (crossmember)
72 mounting points
73 U profile (bearing journal)
74 chassis rails

The invention claimed is:

1. A semitrailer comprising a chassis and at least one vehicle axle with a track guidance system (10) for guiding and stabilizing the vehicle axle along a track, wherein the track guidance system (10) has a Watt linkage arrangement for the relatively movable connection of the vehicle axle to an underside (x) of the chassis, wherein the Watt linkage arrangement has at least two Watt rods (20), which correspond in a common guidance direction (F) and are arranged in the transverse direction (Q), wherein the Watt linkage arrangement has a guide element (30) for guiding the vehicle axle along a straight line in the common guidance direction (F), characterized in that the Watt rods (20) are secured, by means of inner and outer longitudinal ends (22, 24), on the guide element (30) and on the chassis, wherein the guided vehicle axle is a trailer axle (A) of the semitrailer, wherein an axle bridge (40) for the mechanical support of the trailer axle (A) and for receiving the guide element (30) is provided, wherein the guide element (30) is secured substantially centrally on the axle bridge (40), wherein the axle bridge (40) is provided with a basic body (43) facing the trailer axle (A), wherein at least two supporting links are provided, which connect the basic body (43) to the underside (x) of the chassis, wherein the supporting links (44) are fixed rotatably and pivotably on the basic body (43) and on functional links (50) via spherical plain bearings, wherein the guide element (30) is of symmetric elliptical design, wherein the guide element (30) has a central opening (31) and is designed to be widest at the level of the central opening (31), wherein the elliptical guide element (30) has narrow ends (32), which extend in the vertical direction and the guidance direction (H, F), wherein the Guide element (30) is mounted rotatably on the axle bridge (40) to absorb torques associated with driving dynamics, wherein the Watt rods (20) are arranged spaced apart from one another along their common guidance direction (F) and are configured to transmit transverse forces and roll torques during operation, and wherein the Watt rods (20) are secured via joints which lie substantially in the same movement plane.

2. The semitrailer as claimed in claim 1, characterized in that the guided trailer axle (A) comprises a motor-transmission unit, wherein the motor-transmission unit of the trailer axle (A) is dimensioned in such a way that it forms a smaller auxiliary drive for a larger main drive of a semitrailer tractor.

3. The semitrailer as claimed in claim 1, characterized in that the Watt rods (20) are arranged laterally offset in relation to their common guidance direction (F).

4. The semitrailer as claimed in claim 1, characterized in that the Watt rods (20) are of adjustable-length design in the transverse direction (Q), wherein the Watt rods (20) have an adjusting element (27) for adjusting their length.

5. The semitrailer as claimed in claim 1, characterized in that the inner longitudinal ends (22) of the Watt rods (20) are secured rotatably and pivotably on the narrow ends (32) of the guide element (30) via spherical plain bearings (26), wherein the outer longitudinal ends (24) of the Watt rods (20) are secured rotatably and pivotably on the underside (x) of the chassis via spherical plain bearings (26).

6. The semitrailer as claimed in in claim 1, characterized in that two holding brackets (60) are provided in a region of the outer longitudinal ends (24) of the Watt rods (20), wherein the holding brackets (60) are arranged perpendicularly to the underside (x) of the chassis.

7. The semitrailer as claimed in claim 6, characterized in that the two holding brackets (60) have recesses (62), wherein the recesses (62) are matched in shape to corresponding chassis portions on the underside (x) of the chassis.

8. The semitrailer as claimed in in claim 1, wherein the axle bridge (40) has vertical raised portions (42) in the vertical direction (H) on its longitudinal sides.

9. The semitrailer as claimed in claim 8, characterized in that the guide element (30) is secured on the axle bridge (40), wherein the guide element (30) is arranged substantially centrally on the axle bridge (40).

10. The semitrailer as claimed in claim 8, characterized in that the axle bridge (40) has a bearing journal (45), arranged substantially perpendicularly to the trailer axle (A), for the rotatable support of the guide element (30), wherein the bearing journal (45) is arranged in alignment with a vehicle central longitudinal axis.

11. The semitrailer as claimed in claim 10, characterized in that the bearing journal (45) is passed in the longitudinal direction (L) through the vertical raised portions (42) of the axle bridge (40) and through the guide element (30) secured on the axle bridge (40).

12. The semitrailer as claimed in one of claim 8, characterized in that two lateral functional links (50) are fixed in the longitudinal direction (L) on the underside (x) of the chassis, wherein the axle bridge (40) is arranged in the transverse direction (Q) between the lateral functional links (50).

13. The semitrailer as claimed in claim 1, wherein the axle bridge has a rectangular tube profile, wherein the rectangular tube profile comprises an internal framework to reinforce the axle bridge.

14. The semitrailer as claimed in claim 7, wherein the holding brackets have reinforcing struts which extend diagonally over a full height of the holding brackets.

15. The semitrailer as claimed in claim 7, wherein the holding brackets are of identical design.

16. The semitrailer of claim 1, wherein the spherical plain bearings on the basic body are rubber-metal joints which comprise an elastomer.

17. The semitrailer of claim 1, wherein the supporting links extend in longitudinal, transverse and vertical directions.

18. The semitrailer of claim 13, wherein the internal framework of the axle bridge has transverse and/or longitudinal and/or diagonal struts.

* * * * *